(12) United States Patent
Barak et al.

(10) Patent No.: US 11,637,760 B1
(45) Date of Patent: Apr. 25, 2023

(54) SYSTEM, METHOD, AND COMPUTER PROGRAM FOR GENERATING A NETWORK SLICE EXPERIENCE INDEX FOR EVALUATING A NETWORK SLICE

(71) Applicant: Amdocs Development Limited, Limassol (CY)

(72) Inventors: Lior Barak, Ganei-Tikva (IL); Borislav Glozman, Ramat Gan (IL); Andrei Kojukhov, Rishon le Zion (IL); Alla Goldner, Tel Aviv (IL); Avi Chapnick, Ramat Gan (IL); Gabriel Podolsky, Nesher (IL); Roy Segal, Mishmar-David (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 17/688,730

(22) Filed: Mar. 7, 2022

(51) Int. Cl.
*H04L 41/5009* (2022.01)
*H04L 41/50* (2022.01)
*H04L 43/16* (2022.01)

(52) U.S. Cl.
CPC ...... *H04L 41/5009* (2013.01); *H04L 41/5029* (2013.01); *H04L 43/16* (2013.01)

(58) Field of Classification Search
CPC .. H04L 41/5009; H04L 41/5029; H04L 43/16
See application file for complete search history.

(56) References Cited

U.S. PATENT DOCUMENTS

| | | | |
|---|---|---|---|
| 2012/0259993 A1* | 10/2012 | Eidelman | H04L 41/5009 709/230 |
| 2021/0250814 A1* | 8/2021 | Poe | H04L 41/12 |
| 2021/0352534 A1* | 11/2021 | Tiwari | H04W 28/24 |
| 2022/0150794 A1* | 5/2022 | Sparks | H04L 41/5022 |

* cited by examiner

*Primary Examiner* — Joe Chacko
(74) *Attorney, Agent, or Firm* — Zilka-Kotab, P.C.

(57) ABSTRACT

As described herein, a system, method, and computer program are provided for generating a network slice experience index for evaluating a network slice. In use, a guaranteed quality of experience (QoE) is determined for a slice of a network. For at least one point in time, an actual QoE of the network overall is measured. A slice experience index is generated based on a delta between the guaranteed QoE and the actual QoE. The slice of the network is evaluated using the slice experience index.

19 Claims, 7 Drawing Sheets

US 11,637,760 B1

SYSTEM, METHOD, AND COMPUTER PROGRAM FOR GENERATING A NETWORK SLICE EXPERIENCE INDEX FOR EVALUATING A NETWORK SLICE

FIELD OF THE INVENTION

The present invention relates to quality of experience (QoE) for network services.

BACKGROUND

Currently, network technology is capable of providing a customized and guaranteed quality of experience (QoE) for users (e.g. subscribers of the network). This is particularly true for 5G networks that can provide network slicing. In general, network slicing refers to the multiplexing of virtualized and independent logical networks on the same physical network infrastructure.

To date, however, techniques used to evaluate the level of network service that is actually provided to users, especially for pricing purposes, have been limited. Typically, the network service is evaluated solely based on the guaranteed QoE, for example such that pricing is statically tied to the level of QoE that has been guaranteed. Thus, current evaluation techniques do not consider the guaranteed QoE relative to the actual conditions of the network.

There is thus a need for addressing these and/or other issues associated with the prior art.

SUMMARY

As described herein, a system, method, and computer program are provided for generating a network slice experience index (SEI) for evaluating a network slice. In use, a guaranteed quality of experience (QoE) is determined for a slice of a network. For at least one point in time, an actual QoE of the network overall is measured. A slice experience index is generated based on a delta between the guaranteed QoE and the actual QoE. The slice of the network is evaluated using the slice experience index.

DETAILED DESCRIPTION

Figure 1:
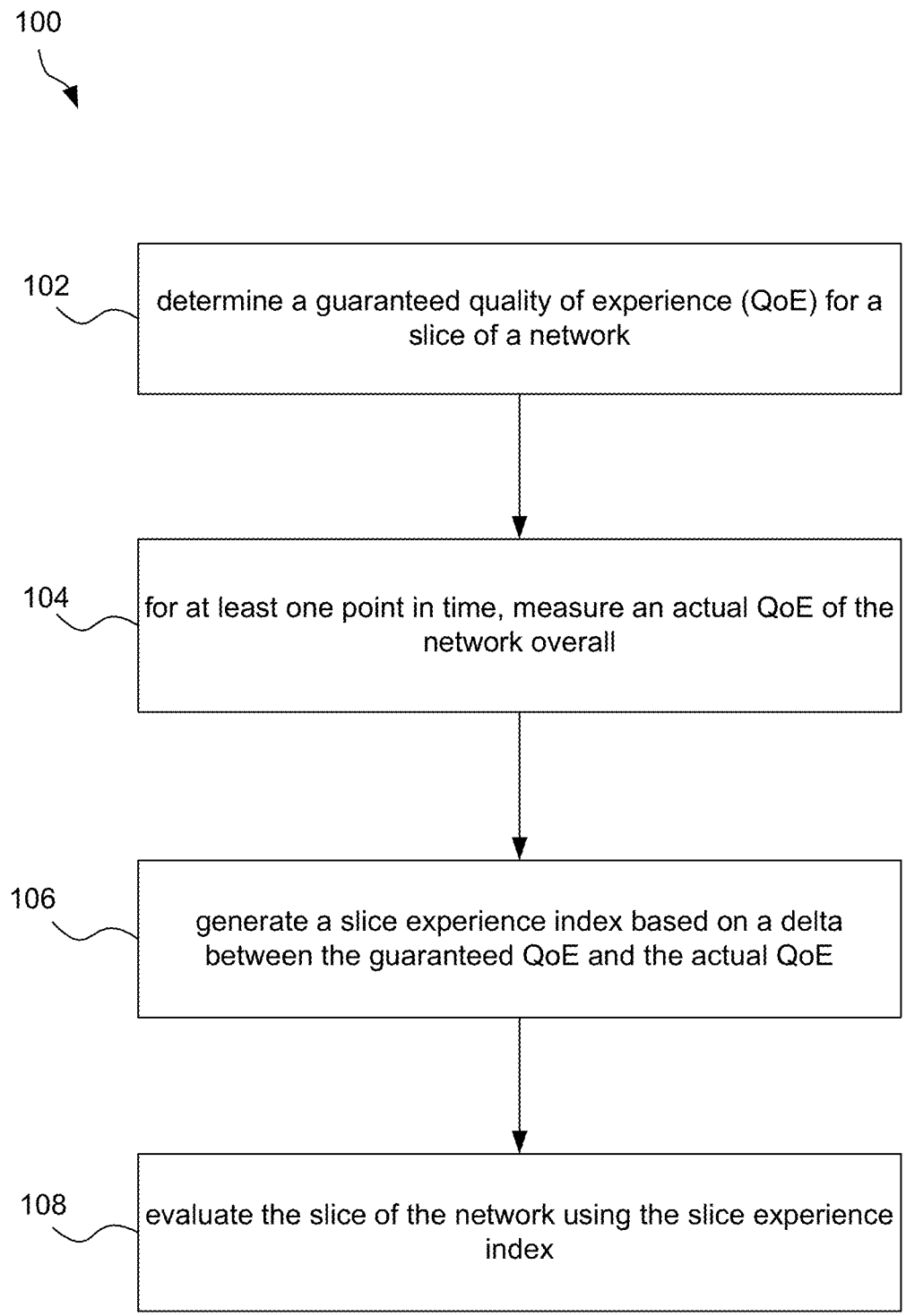
FIG. 1 illustrates a method for generating a network slice experience index for evaluating a network slice, in accordance with one embodiment.

FIG. 1 illustrates a method 100 for generating a network slice experience index for evaluating a network slice, in accordance with one embodiment. The method 100 may be performed by any computer system described below with respect to FIGS. 6 and/or 7. For example, the method 100 may be performed by a computer system of a communication service provider (CSP) that provides a 5G network for use by its users (e.g. customers, subscribers, etc.).

In operation 102, a guaranteed quality of experience (QoE) is determined for a slice of a network. The slice of the network, which may also be called a "network slice" herein, refers to a virtualized and independent logical network within a physical network, such as a 5G network, for which a guaranteed QoE can be configured. In an embodiment, the slice may already be deployed within the network. In another embodiment, the slice may not yet be deployed within the network.

The guaranteed QoE may be predefined for the slice. The guaranteed QoE may also be defined for an application of a network user. For example, the guaranteed QoE may be selected by a user as a requirement for an application intended to be used by the user via the network. In this example, the slice that would be provisioned in the network for use by the application/user would be configured to provide the guaranteed QoE.

In the context of the present description, QoE refers to a measure of a network quality. In the present embodiment then, the guaranteed QoE may refer to a measure of the quality of the slice of the network. QoE may be measured as a function of a plurality of quality of service (QoS) parameters, such as throughput, latency, packet delay, packet loss, etc. Thus, the guaranteed QoE may be defined in terms of a guarantee for one or more of the QoS parameters.

In operation 104, for at least one point in time, an actual QoE of the network overall is measured. In an embodiment, the at least one point in time may be a current point in time. In another embodiment, the at least one point in time may be a time period that spans a current point in time and one or more preceding points in time.

As noted above, QoE refers to a measure of a network quality. In the present embodiment then, the actual QoE of the network overall may refer to a measure of the quality of one or more remaining portions of the network that do not include the slice of the network. The one or more remaining portions of the network may be all remaining portions of the network or select remaining portions of the network (e.g. that support a same type of application as the application mentioned above). In an embodiment, the actual QoE may be defined in terms of an actual measurement in the network for one or more of the QoS parameters (e.g. that correspond to the guaranteed QoS parameters).

In operation 106, a slice experience index is generated based on a delta between the guaranteed QoE and the actual QoE. In the context of the present description, the slice experience index is a data structure (e.g. table, array, etc.) that contains data indicating the delta between the guaranteed QoE and the actual QoE. Accordingly, in one embodiment, the slice experience index may indicate an improvement (i.e. positive delta) of the guaranteed QoE with respect to the actual QoE.

In an embodiment, the delta between the guaranteed QoE and the actual QoE may be determined for the plurality of QoS parameters mentioned above. For example, the slice experience index may indicate the delta for each of the QoS parameters. In an embodiment, one or more of the QoS parameters may relate to requirements of the application for which the guaranteed QoE has been defined, such as a voice requirement and/or a video requirement. In another embodiment, a weight may be configured for each of the plurality of QoS parameters, such that the data in the slice experience index is weighted accordingly.

In operation 108, the slice of the network is evaluated using the slice experience index. It should be noted that the slice may be evaluated for any desired purpose. In an embodiment, a change to the network may be made based on a result of the evaluation, such as deploying the slice, continuing to deploy the slice, etc.

In an embodiment, the slice of the network may be evaluated by calculating a price for the slice of the network as a function of the slice experience index. With respect to this embodiment, the measuring (operation 104) and generating (operation 106) may be repeated for subsequent points in time such that the price for the slice of the network can dynamically change over time. Further with respect to this embodiment, a charge for usage of the slice of the network may be made, in accordance with the price.

In another embodiment, a user of the slice of the network may be notified about a result of the evaluation. As an option, the notification may enable the user to select whether to initially use the slice of the network (e.g. when the slice has not yet been deployed) or whether to continue to use the slice of the network (e.g. when the slice has already been deployed). Just by way of example, when the evaluation includes calculating a price for the slice of the network as a function of the slice experience index, then the notification can enable the user to select whether to (e.g. continue to) use the slice of the network based on the price for the slice of the network. In any case, the user may be automatically removed from the slice when the user selects to not continue to use the slice of the network and/or the slice may not be deployed to the network when the user selects to not even initially use the slice. On the other hand, the user may be automatically charged for usage of the slice of the network when the user selects to (e.g. continue to) use the slice of the network.

To this end, the method 100 may be performed to provide a dynamic evaluation (e.g. pricing) of the network slice with regard to an actual QoE of the network overall. As noted above, this method 100 may be repeated over time with regard to the same slice. As a result, the evaluation may be performed with respect to a current, or relatively current, state of the network as reflected in the slice experience index.

As a further option, the method 100 may be repeated for additional slices of the network. Results of the evaluation for each of the slices (e.g. pricing with a guaranteed level of QoE per slice) may be output to a mobile device of a user for use by the user in selecting one of the slices to use for the mobile device. This may occur automatically to proactively push the evaluation results to the mobile device of the user, or may occur upon a trigger associated with the mobile device (e.g. change in location, change in performance, opening of an application, etc.).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
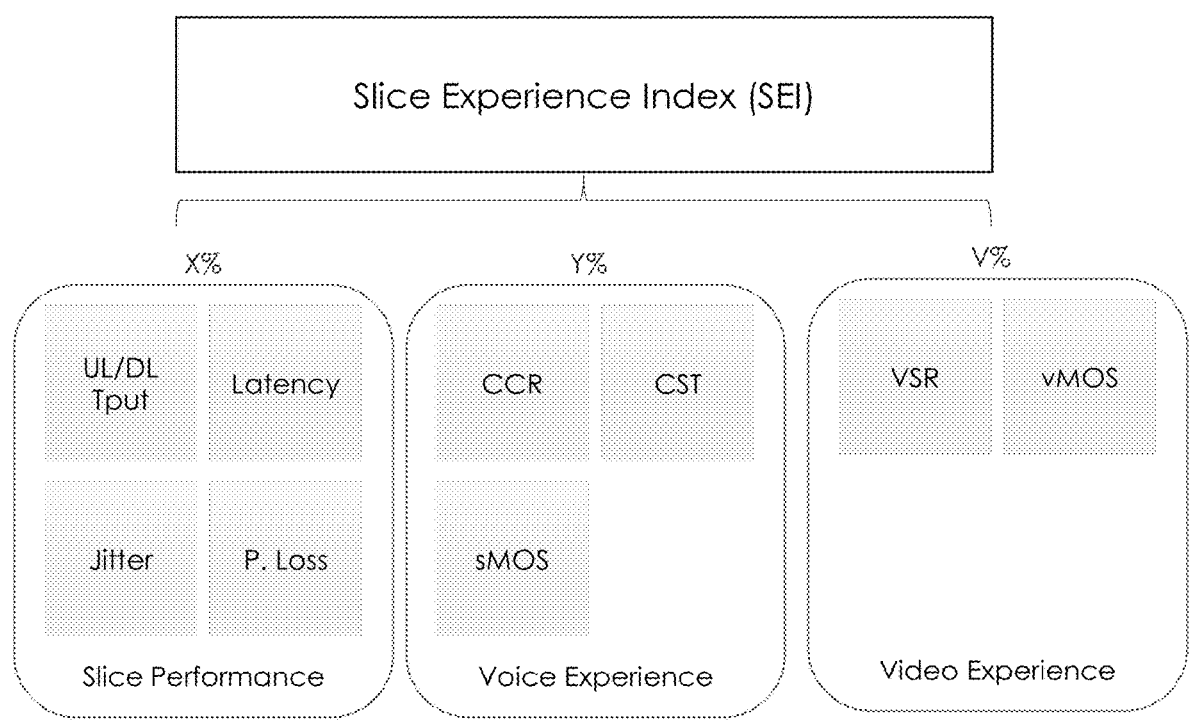
FIG. 2 illustrates a slice experience index, in accordance with one embodiment.

FIG. 2 illustrates a slice experience index 200, in accordance with one embodiment. As an option, the slice experience index 200 may be implemented in the context of the details of the previous figure and/or any subsequent figure(s). Of course, however, the slice experience index 200 may be implemented in the context of any desired environment. Further, the aforementioned definitions may equally apply to the description below.

As shown, the slice experience index 200 is composed of QoS parameters relating to slice performance, voice experience, and video experience. The present embodiment may involve an application running, or to be run, in the network which has voice and video requirements.

As shown, the slice performance QoS parameters include upload/download throughput (UP/DL Tput), latency, jitter (packet delay), and packet loss, and/or any additional parameters, and/or any combination thereof. The voice experience QoS parameters include call complete rate (CCR), call setup time (CST), and voice quality (sMOS), and/or any additional parameters, and/or any combination thereof. The video experience QoS parameters include video playing success rate (VSR) and video quality (vMOS), and/or any additional parameters, and/or any combination thereof.

The slice performance QoS parameters, voice experience QoS parameters, and video experience QoS parameters may also each have a weight assigned thereto (shown as X %, Y %, and V % respectively). The weight may be assigned by the CSP.

To this end, the slice experience index 200 may represent a consolidated slice experience model. As noted above with respect to the method 100 of FIG. 1, a slice charging rate may be determined dynamically upon the actual QoE improvement indicated by the slice experience index 200. The actual QoE improvement may be calculated based on the slice experience index 200 delta between the "regular" network and the slice performance: SEI Delta=SEI_1 (Slice)/SEI_2 (Regular). Thus, the actual QoE over the "regular" network may be constantly calculated to reflect the actual value provided to the user.

Figure 3:
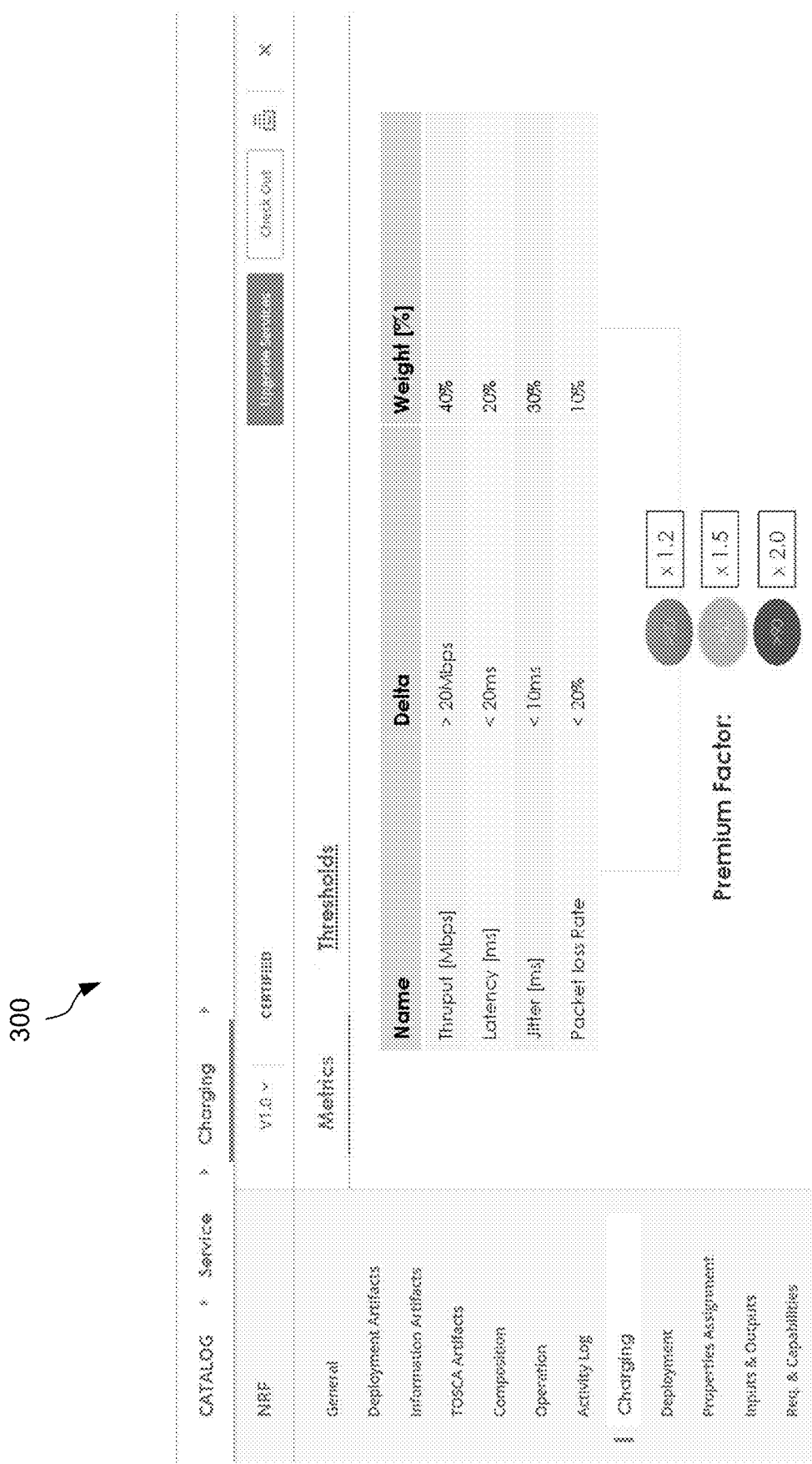
FIG. 3 illustrates a user interface for configuring thresholds of QoS parameters used for a network slice evaluation, in accordance with one embodiment.

FIG. 3 illustrates a user interface 300 for configuring thresholds of QoS parameters used for a network slice evaluation, in accordance with one embodiment. As an option, the user interface 300 may be implemented in the context of the details of the previous figure and/or any subsequent figure(s). Of course, however, the user interface 300 may be implemented in the context of any desired environment. Further, the aforementioned definitions may equally apply to the description below.

In addition to the QoS parameters defined for the slice experience index (e.g. item 200 of FIG. 2), delta/thresholds can also be defined (e.g. by the CSP) per QoS parameter. In the example shown, when the Thruput (throughput) delta >20 Mbps then a defined weight or premium may be applied, when the Latency delta <20 ms then a defined weight or premium may be applied, when the Jitter delta <10 ms then a defined weight or premium may be applied, and when the Packet loss delta <20% then a defined weight or premium may be applied.

Figure 4:
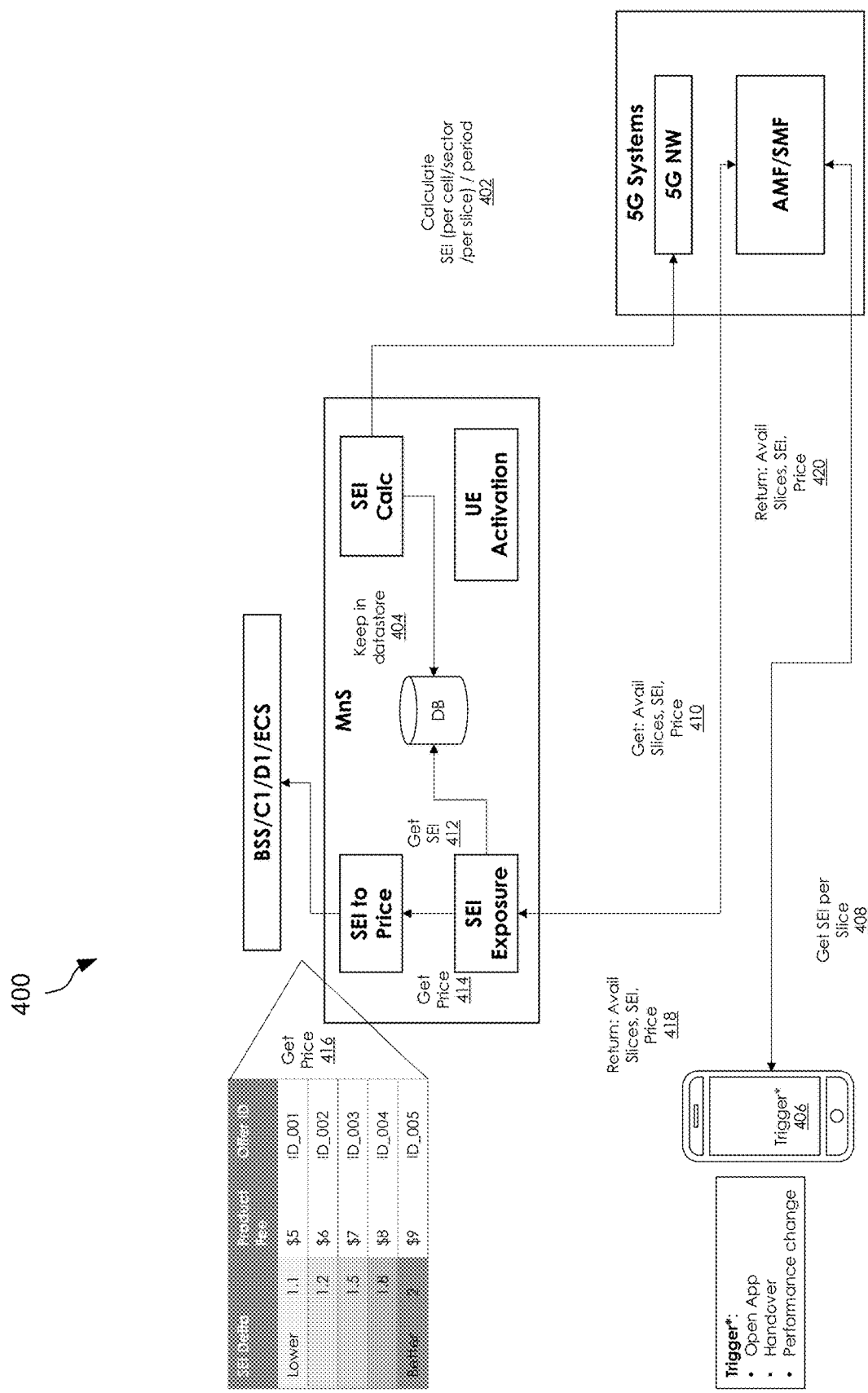
FIG. 4 illustrates a flow diagram of a system for pricing a network slice using a network slice experience index, in accordance with one embodiment.

FIG. 4 illustrates a flow diagram of a system 400 for pricing a network slice using a network slice experience index, in accordance with one embodiment. As an option, the system 400 may be implemented in the context of the details of the previous figure and/or any subsequent figure(s). Of course, however, the system 400 may be implemented in the context of any desired environment. Further, the aforementioned definitions may equally apply to the description below.

In 402, a slice experience index ("SEI") is calculated per slice and time period by a slice experience index calculator that takes measurements of a 5G network. In 404, the slice experience index is stored in a datastore. In 406, a trigger is detected on a mobile device of a user. The trigger can be the opening of an application on the mobile device, a handover of the mobile device to the network, or a performance change associated with the network.

In 408, the slice experience index is caused to be retrieved per slice of the network. In 410, available slices, their corresponding slice experience indexes, and their corresponding prices are caused to be retrieved. 410 is shown as sub-operations which include retrieving each SEI from the datastore (operation 412), causing a price for each SEI to be calculated (operation 414), and calculating the price per SEI by a business support solution/Evolved Charging Suite (BSS/C1/D1/ECS) (operation 416). In 418, the available slices, their corresponding slice experience indexes, and their corresponding prices are returned to the Access and Mobility Management Function/Session Management Function (AMF/SMF) of the system, and in 420 the available slices, their corresponding slice experience indexes, and their corresponding prices are returned to the mobile device.

Just by way of example, for an augmented reality/virtual reality (AR/VR) application, the available slices (i.e. QoE options) may include a first slice providing a best effort QoE at a first price and a second slice providing a guaranteed QoE at a second price that is higher than the first price. As another example, for a gaming application, the available slices may include a first slice providing a guaranteed QoE for a single player at a first price and a second slice providing a guaranteed QoE for multiple players at a second price that is higher than the first price. In yet another example, for a trading application, the available slices may include a first slice providing a normal QoE at a first price and a fast trade (better QoE) at a second price that is higher than the first price.

Figure 5:
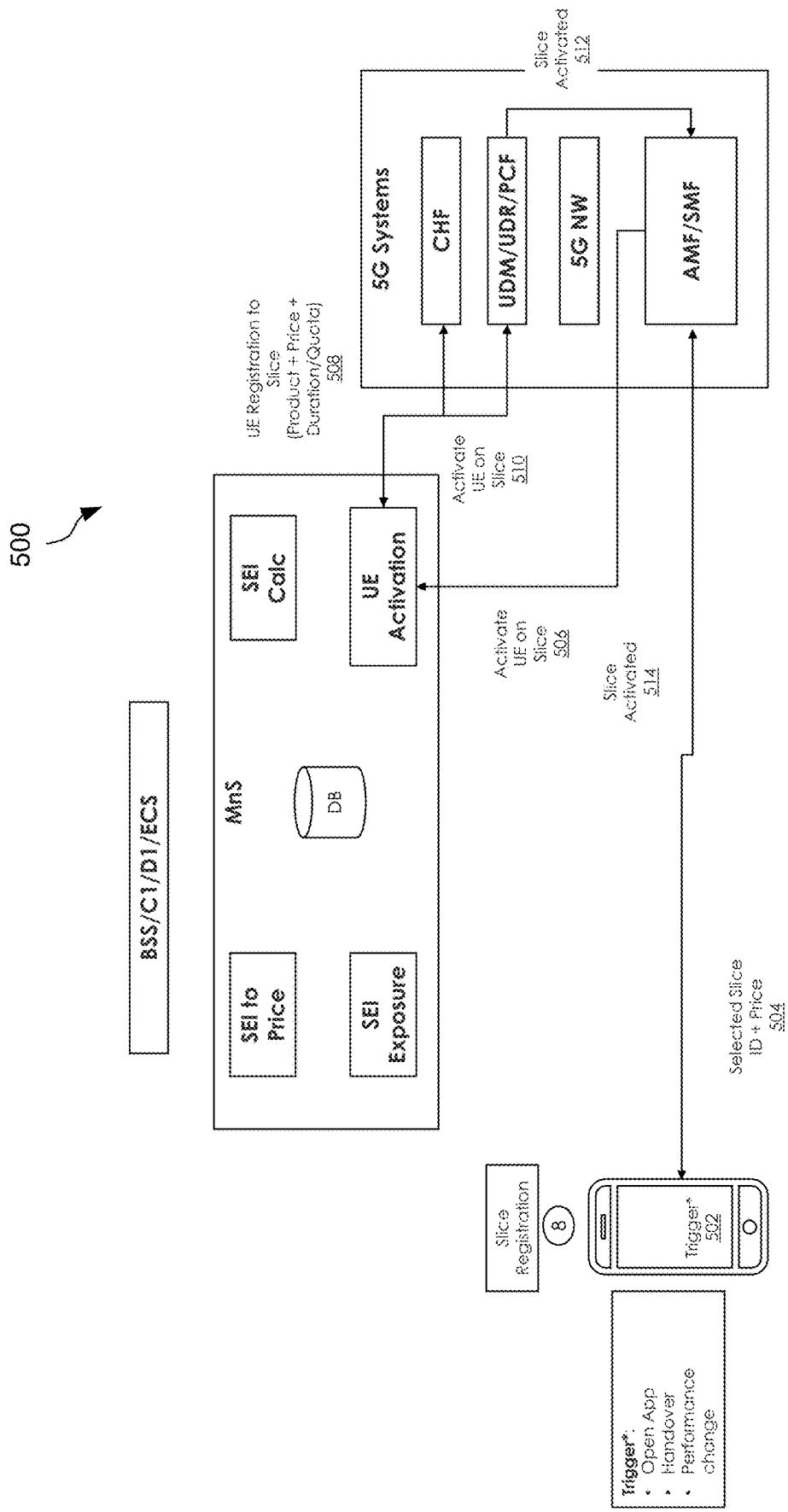
FIG. 5 illustrates a flow diagram of a system for selecting a network slice, in accordance with one embodiment.

FIG. 5 illustrates a flow diagram of a system 500 for selecting a network slice, in accordance with one embodiment. As an option, the system 500 may be implemented in the context of the details of the previous figure and/or any subsequent figure(s). Of course, however, the system 500 may be implemented in the context of any desired environment. Further, the aforementioned definitions may equally apply to the description below.

In 502, a trigger is detected on a mobile device of a user. The trigger can be the opening of an application on the mobile device, a handover of the mobile device to the network, or a performance change associated with the network. In 504, a slice identifier and corresponding price are selected by the user. For example, the selection may be made from the available slices, their corresponding slice experience indexes, and their corresponding prices returned to the mobile device in 420 of FIG. 4.

In 506, an instruction is issued to activate the mobile device (UE) on the selected slice. In 508, a Core Charging Function (CHF) is notified of the mobile device registration to the slice, including a notification of the slice, price, and a duration/quota of usage allowed. In 510, a Unified Data Management/User Data Repository/Policy Control Function (UDM/UDR/PCF) are instructed to activate the mobile device on the slice. In 512, the AMF/SMF are notified of the mobile device activation on the slice. In 514, the mobile device is notified of its activation on the slice.

Additional Embodiment 1

In one additional embodiment that may be used in combination with any of the embodiments described above, the calculated pricing may be communicated to the mobile device operation system in a "Push" mode, as opposed to relying on the trigger 406 in FIG. 4. In this embodiment, the user can make an on-the-fly selection regarding the desired QoE option. The selected QoE option may be communicated back by the mobile device operation system to the network backend systems for on-line registration.

For example, the mobile device operation system may constantly listen to events generated by the network backend systems regarding various QoE options. Upon receiving an event, the mobile device operating system presents the various QoE options to the user (e.g. operation 420 of FIG. 4). The user makes a selection of the desired QoE option and the associated price (e.g. operation 504 of FIG. 5). The mobile device operation system communicates back the user selection to the network backend systems.

Additional Embodiment 2

In another additional embodiment that may be used in combination with any of the embodiments described above, when the user gets a notification about the different QoE options upon opening an application (e.g. during operation 420 of FIG. 4), the notification may include only the pricing options that are relevant for the application type (e.g. gaming, AR/VR, etc.).

For example, when the user opens an application that may benefit from a better QoE (e.g. trigger of operation 406 of FIG. 4), a query from the mobile device operating system to the network backend systems may be generated for getting the list of available QoE options. The relevant QoE options with the calculated pricing options may be presented to the user for on-the-fly selection.

Additional Embodiment 3

In yet another additional embodiment that may be used in combination with any of the embodiments described above, upon the mobile device getting into a coverage area with available premium network services (e.g. the handover trigger of operation 406 of FIG. 4 in which the mobile device is in a network area having the option for network slicing with guaranteed QoE), a notification may be triggered regarding various pricing options. The mobile device operating system may get a notification message about the calculated pricing options, when getting into such an area. Upon getting the notification, the mobile device operating system can present the available options to the user for selecting the appropriate network service (e.g. operation 420 of FIG. 4).

For example, the mobile device may change location, and then based on the new location (handover to an area that provides premium network services), the network backend systems initiate information about pricing options and send those to the mobile device, which presents it to the user. As an option, each coverage area could have different premium network services, and the user could select a different network service based on his needs. This adds the ability of the network to notify the user about the availability of premium network services and their price, and therefore may require the mobile device to be able to receive such notifications.

Additional Embodiment 4

In still yet another additional embodiment that may be used in combination with any of the embodiments described above, upon the mobile device performance changing significantly due to network conditions or users density (e.g. the performance trigger of operation 406 of FIG. 4), a notification may be triggered regarding various pricing options. The mobile device operating system may have the ability to get a notification message about the calculated pricing options, including when the mobile device performance changes significantly and premium network services are available. Upon getting the notification, the mobile device operating system can present the available options to the user for selecting the appropriate network service.

For example, when the performance of the mobile device changes significantly (above a defined threshold level, such as during a traffic jam or network condition changes), based on the mobile device location, the network backend systems initiate information about pricing options and send those the mobile device, which in turn presents it to the user. In each area, there may be different premium network services, such that the user can select a different network service based on his needs. Thus, the network may have the ability to notify the user about the availability of premium network services and their price, which requires the mobile device operating system to be able to receive such notifications.

Figure 6:
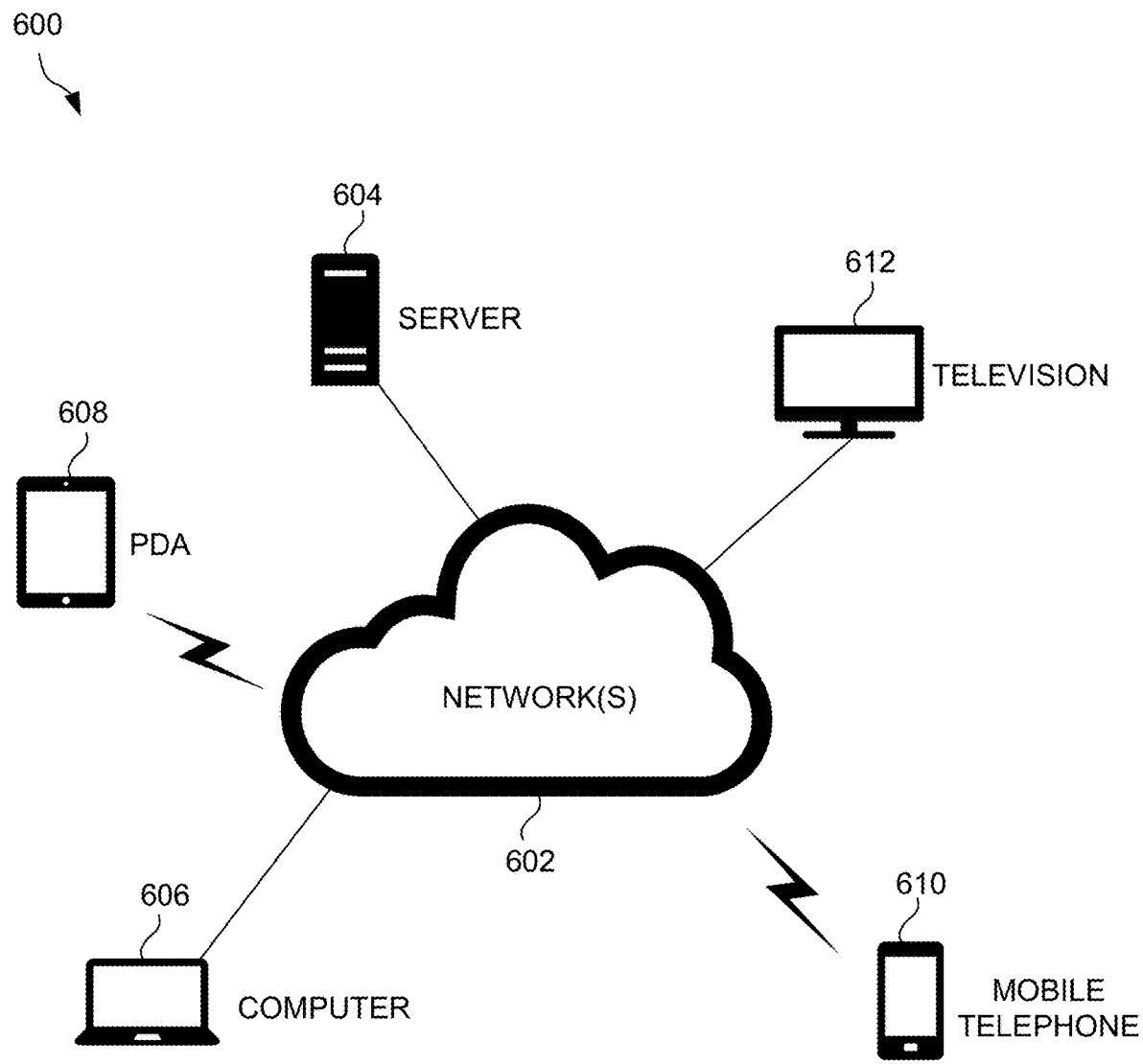
FIG. 6 illustrates a network architecture, in accordance with one possible embodiment.

FIG. 6 illustrates a network architecture 600, in accordance with one possible embodiment. As shown, at least one network 602 is provided. In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 604 and an end-user computer 606 may be coupled to the network 602 for communication purposes. Such end-user computer 606 may include a desktop computer, lap-top computer, and/or any other type of logic. Still yet, various other devices may be coupled to the network 602 including a personal digital assistant (PDA) device 608, a mobile phone device 610, a television 612, etc.

Figure 7:
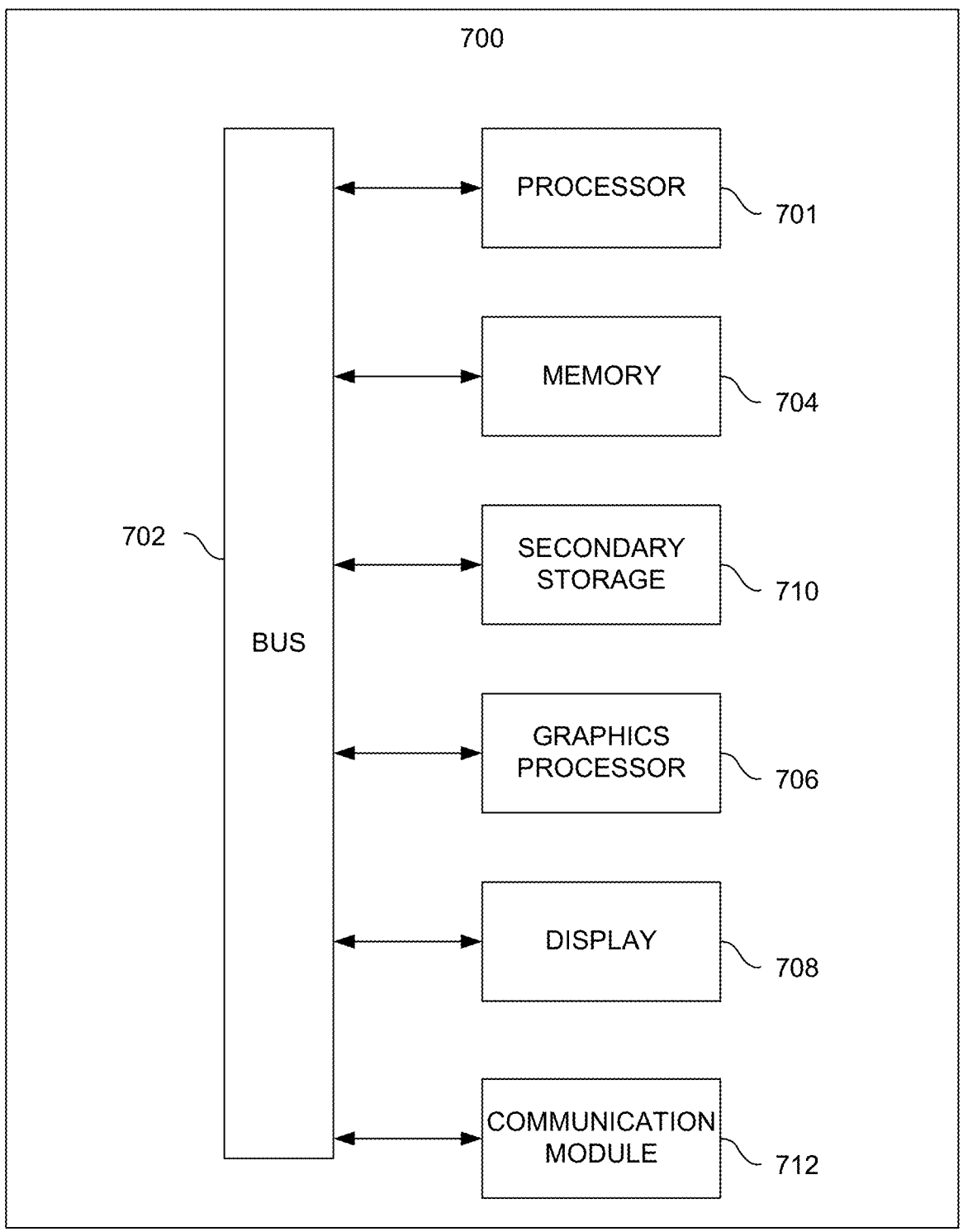
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. Of course, the system 700 may be implemented in any desired environment.

As shown, a system 700 is provided including at least one central processor 701 which is connected to a communication bus 702. The system 700 also includes main memory 704 [e.g. random access memory (RAM), etc.]. The system 700 also includes a graphics processor 706 and a display 708.

The system 700 may also include a secondary storage 710. The secondary storage 710 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 704, the secondary storage 710, and/or any other memory, for that matter. Such computer programs, when executed, enable the system 700 to perform various functions (as set forth above, for example). Memory 704, storage 710 and/or any other storage are possible examples of non-transitory computer-readable media.

The system 700 may also include one or more communication modules 712. The communication module 712 may be operable to facilitate communication between the system 700 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic formats. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high-definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
   determine a guaranteed quality of experience (QoE) for a slice of a network;
   for at least one point in time, measure an actual QoE of the network overall;
   generate a slice experience index based on a delta between the guaranteed QoE and the actual QoE; and
   evaluate the slice of the network using the slice experience index, wherein evaluating the slice of the network using the slice experience index includes:
   calculating a price for the slice of the network as a function of the slice experience index.

2. The non-transitory computer-readable media of claim 1, wherein the guaranteed QoE is defined for an application of a network user.

3. The non-transitory computer-readable media of claim 1, wherein the at least one point in time includes a current time.

4. The non-transitory computer-readable media of claim 1, wherein the delta between the guaranteed QoE and the actual QoE is determined for a plurality of quality of service (QoS) parameters.

5. The non-transitory computer-readable media of claim 4, wherein the plurality of QoS parameters include at least one of throughput, latency, packet delay, or packet loss.

6. The non-transitory computer-readable media of claim 1, wherein the slice experience index indicates an improvement of the guaranteed QoE with respect to the actual QoE.

7. The non-transitory computer-readable media of claim 1, wherein the measuring and generating are repeated for subsequent points in time such that the price for the slice of the network dynamically changes over time.

8. The non-transitory computer-readable media of claim 1, wherein the device is further caused to:
   charge for usage of the slice of the network, in accordance with the price.

9. The non-transitory computer-readable media of claim 1, wherein the device is further caused to:
   notify a user of the slice of the network about a result of the evaluation.

10. The non-transitory computer-readable media of claim 9, wherein the notification enables the user to select whether to continue to use the slice of the network.

11. The non-transitory computer-readable media of claim 10, wherein when the evaluation includes calculating a price for the slice of the network as a function of the slice experience index, then the notification enables the user to select whether to continue to use the slice of the network based on the price for the slice of the network.

12. The non-transitory computer-readable media of claim 10, wherein the device is further caused to:
   automatically remove the user from the slice when the user selects to not continue to use the slice of the network.

13. The non-transitory computer-readable media of claim 1, wherein the determining, measuring, generating, and evaluating are repeated for one or more additional slices of the network.

14. The non-transitory computer-readable media of claim 13, wherein results of the evaluating the slice of the network and the additional slices of the network are pushed to a mobile device of a user such that user selects the slice or one of the one or more additional slices for use by the mobile device.

15. The non-transitory computer-readable media of claim 13, wherein the determining, measuring, generating, and evaluating are performed for the slice of the network and are repeated for the one or more additional slices of the network when a user opens an application on a mobile device, and wherein the slice and the one of the one or more additional slices are relevant for a type of the application, and further wherein results of the evaluating the slice of the network and the additional slices of the network are provided to the mobile device such that user selects the slice or one of the one or more additional slices for use by the mobile device.

16. The non-transitory computer-readable media of claim 13, wherein the determining, measuring, generating, and evaluating are performed for the slice of the network and are repeated for the one or more additional slices of the network when a mobile device handover is performed to an area having the option for network slicing with guaranteed QoE, and wherein results of the evaluating the slice of the network and the additional slices of the network are provided to the mobile device such that user selects the slice or one of the one or more additional slices for use by the mobile device.

17. The non-transitory computer-readable media of claim 13, wherein the determining, measuring, generating, and evaluating are performed for the slice of the network and are repeated for the one or more additional slices of the network when performance of a mobile device changes more than a threshold level, and wherein results of the evaluating the slice of the network and the additional slices of the network are provided to the mobile device such that user selects the slice or one of the one or more additional slices for use by the mobile device.

18. A method, comprising:
at a computer system:
determining a guaranteed quality of experience (QoE) for a slice of a network;
for at least one point in time, measuring an actual QoE of the network overall;
generating a slice experience index based on a delta between the guaranteed QoE and the actual QoE;
evaluating the slice of the network using the slice experience index;
notifying a user of the slice of the network about a result of the evaluation, wherein the notification enables the user to select whether to continue to use the slice of the network; and
automatically removing the user from the slice when the user selects to not continue to use the slice of the network.

19. A system, comprising:
a non-transitory memory storing instructions; and
one or more processors in communication with the non-transitory memory that execute the instructions to:
determine a guaranteed quality of experience (QoE) for a slice of a network;
for at least one point in time, measure an actual QoE of the network overall;
generate a slice experience index based on a delta between the guaranteed QoE and the actual QoE;
evaluate the slice of the network using the slice experience index;
notify a user of the slice of the network about a result of the evaluation, wherein the notification enables the user to select whether to continue to use the slice of the network; and
automatically remove user from the slice when the user selects to not continue to use the slice of the network.

* * * * *